No. 811,533. PATENTED FEB. 6, 1906.
E. H. ANDERSON.
CONTROL OF AUTOMOBILE MOTORS.
APPLICATION FILED JUNE 29, 1905.
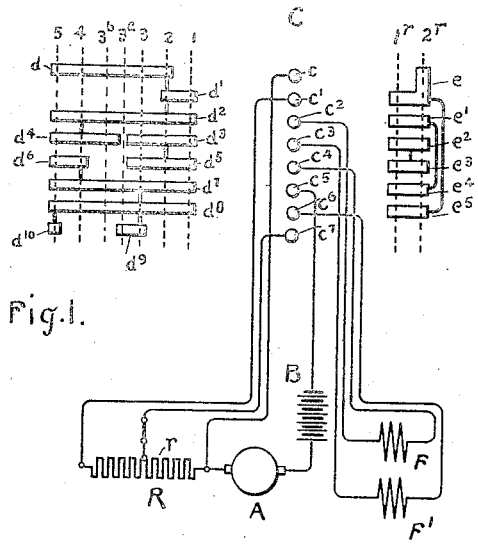
Fig. 1.
Fig. 2.
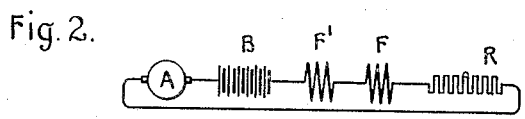
Fig. 3.
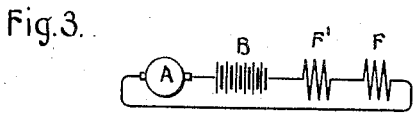
Fig. 4.
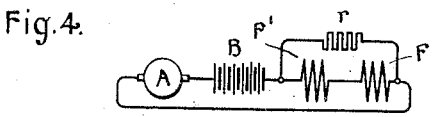
Fig. 5.
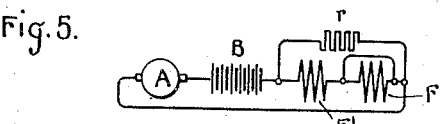
Fig. 6
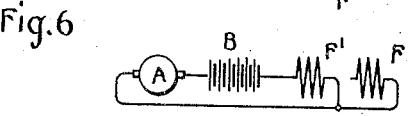
Fig. 7
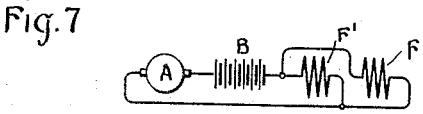
Fig. 8.
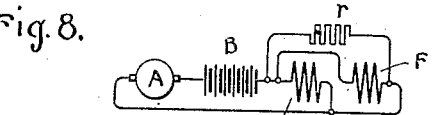
Witnesses
J. Ellis Glen
Allen Alford
Inventor
Edward H. Anderson
by Albert G. Davis
Atty.

UNITED STATES PATENT OFFICE.

EDWARD H. ANDERSON, OF SCHENECTADY, NEW YORK, ASSIGNOR TO GENERAL ELECTRIC COMPANY, A CORPORATION OF NEW YORK.

CONTROL OF AUTOMOBILE MOTORS.

No. 811,533.

Specification of Letters Patent.

Patented Feb. 6, 1906.

Application filed June 29, 1905. Serial No. 267,510.

*To all whom it may concern:*

Be it known that I, EDWARD H. ANDERSON, a citizen of the United States, residing at Schenectady, in the county of Schenectady and State of New York, have invented certain new and useful Improvements in Control of Automobile Motors, of which the following is a specification.

The present invention relates to means for controlling the operation and speed of electric motors, and more particularly single motors employed for propelling automobiles or the like.

It has heretofore been the practice in single-motor drives for automobiles, wherein acceleration and speed-changes are effected through variation of the resistance in the motor-circuit and of the relative connection of the motor-windings, to open the motor-circuit as an intermediate step in the making of a change in the circuit connections. It is evident that the opening of the motor-circuit, if but for an instant, takes away the torque of the motor. When the circuit is again completed and the torque established, the motor runs free until all the lost motion in the driving connection is taken up, whereupon it delivers a hammer-blow to the driven part and jerks the vehicle onward. This jerky action is not only extremely disagreeable to the occupants, but is also injurious to the mechanism. Aside from the objections to the irregular propelling action of the motor the breaking and making of the motor-circuits, whenever a change in the motor-circuit is to be effected, is injurious to the battery and reduces its efficiency by reason of the sudden rush of current which takes place upon the making of the circuit. If the torque is materially diminished in making transitions, then, even though the motor-circuit be not entirely interrupted, the jerky action is produced.

The object of the present invention is to provide a system of control for a single motor of the character specified, so arranged that the various speed-changes may be effected without interrupting the circuit and without materially reducing the torque of the motor.

The present invention will be more clearly understood from the following description thereof and of the preferred means for carrying it out.

In the accompanying drawings, Figure 1 illustrates diagrammatically a motor and a controller arranged and connected in accordance with the present invention, and Figs. 2 to 8 indicate the circuit conditions corresponding to various portions of the controller.

In the system illustrated the motor has two series field-windings, and the control apparatus is arranged to provide five running speeds, although as to these features modifications may of course be made. A is the motor-armature. F and F' are the field-windings. B is the storage battery. R is a resistance, and C is a controller.

The controller is shown as consisting of a developed cylinder having segments $d$ $d^{10}$ and $e$ $e^5$, which comprise movable contacts, together with a row of fingers $c$ $c^7$, which coöperate with the segmental contacts. The contacts $d$ $d^{10}$ control the motor for driving the vehicle forward, and the contacts $e$ $e^5$ are brought into play for reversing. These two groups of contacts may be alike except in that they change the relative connection of the field-windings to the armature. However, it is not necessary to run the motor at high speeds in reversing the vehicle, so that the number of running positions may be reduced to one or two.

Referring to Fig. 1, it will be seen that on turning the controller so as to bring the movable contacts into engagement with the fixed fingers along line 1 a circuit is completed from one terminal of the battery through the motor-armature, through the resistance R, through contact $c'$, contacts $d'$ and $d^2$, field-winding F, contact $c^4$, contacts $d^5$, $d^3$, and $d^6$, field-winding F', contact $c^6$, and thence to the opposite terminal of the battery through contacts $d^8$, $d^7$, and $c^5$. The motor-circuit is now as shown in Fig. 2 and the motor is running at its lowest speed. Upon turning the controller to position 2 no change is produced except that the resistance R is short-circuited at contacts $c$ and $c'$, $d$ and $d'$; the motor being now connected as shown in Fig. 3 and the motor running at an increased speed. When the controller is moved to position 3, contact $d^9$ comes into engagement with contact $c^7$ and the current after it leaves the armature instead of passing wholly through the field-windings and back to the battery now passes in the part through section $r$ of the resistance R, through contacts $c^7$, $d^9$, $d^8$, $d^7$, and $c^5$ to the battery—namely, the resistance $r$ is shunted about the field-windings, as illustrated in Fig. 4. Less current now passes through the field-windings than in the previous position of the controller. Therefore the motor runs at an increased speed.

In order to obtain the next highest speed, the shunt is removed and the field-windings are connected in parallel, this being accomplished by means of a series of operations, which take place as the controller is moved from position 3 to position 4—namely, in position $3^a$ finger $c^3$ engages simultaneously with contact $d^3$ and $d^4$, whereby the current instead of flowing from contact $c^2$ through field-winding F and thence to field-winding F' through contacts $c^4$ and $c^3$ now flows from contact $c^2$ through contacts $d^2$ and $d^4$ directly to contact $c^3$, short-circuiting field-winding F. The short-circuiting connection is made, however, without interrupting the circuit of the motor. In position $3^b$ segment $d^3$ has left contact $c^3$ and segment $d^9$ has left contact $c^7$, thereby disconnecting field-winding F and opening the shunt containing the resistance $r$, the circuit being now as shown in Fig. 6. In position 4 of the controller segment $d^6$ engages with finger $c^4$ and current flows through the field-windings in parallel—namely, from finger $c$ a circuit passes through the movable contacts $d$ $d^4$, thence through contact $c^3$, field-windings F', and to the battery, and another circuit passes from contact $c$ through the movable contacts $d$ $d^2$ through contact $c^2$ through the field-winding F and thence to the battery through contact $c^4$, $d^6$, $d^7$, and $c^5$. In the final position of the controller contact $d^{10}$ engages with contact $c^7$ and the shunt, including the resistance $r$, is again placed about the field-windings, as illustrated in Fig. 8, giving a weaker field than before, and consequently an increased speed.

It is noted that at no time is the motor-circuit interrupted after the controller has been moved to its first running position until it is again returned to its "off" position. Thus the motor at no time loses its torque, but is always exerting a propelling effort. It is also seen that the armature-current is not reduced during the change from series to parallel, and therefore the torque does not decrease, thereby insuring that the propelling effort shall be smooth and comfortable.

It is evident that the resistance $r$ instead of being a portion of the resistance R may be an entirely separate and independent resistance.

Although I have described the present invention in the preferred form, I do not desire to be limited to the particular form illustrated except to the extent indicated in the accompanying claims.

What I claim as new, and desire to secure by Letters Patent of the United States, is—

1. In a single-motor drive for automobiles, a storage battery, a motor provided with a plurality of field-windings, and a controller having contacts arranged and connected to connect said motor to said battery with the field-windings in series, shunt one of the field-windings, remove said shunted field-winding without breaking the shunt, and then connect the field-windings in parallel.

2. In a single-motor drive for automobiles, a source of current-supply, a motor having two field-windings, a resistance, and a controller having contacts arranged to connect said motor to said source of current-supply with the field-windings in series with each other, then connect said field-windings in parallel with said resistance, then shunt one of said field-windings, then remove said resistance and cut out said latter field-winding without opening the shunt and finally connect the idle field-winding in parallel with the remaining field-winding.

3. In a single-motor drive for automobiles, a source of current-supply, a motor having two field-windings, a resistance, and a controller having a plurality of running positions and contacts arranged to connect said motor to said source of current-supply with its field-windings in series in one position of the controller, to place said resistance in parallel with the field-windings in a second position, to remove said resistance and connect the field-windings in parallel in a third position, and to first place a shunt about one of said field-windings and then disconnect said latter field-winding without breaking the shunt in passing from the second to the third position.

In witness whereof I have hereunto set my hand this 27th day of June, 1905.

EDWARD H. ANDERSON.

Witnesses:
BENJAMIN B. HULL,
HELEN ORFORD.